United States Patent [19]
Kirk et al.

[11] Patent Number: 5,444,244
[45] Date of Patent: Aug. 22, 1995

[54] PIEZORESISTIVE CANTILEVER WITH INTEGRAL TIP FOR SCANNING PROBE MICROSCOPE

[75] Inventors: Michael D. Kirk, San Jose; Ian R. Smith, Los Gatos; Marco Tortonese, Standford; Sean S. Cahill, Cupertino; Timothy G. Slater, San Francisco, all of Calif.

[73] Assignee: Park Scientific Instruments Corporation, Sunnyvale, Calif.

[21] Appl. No.: 73,201

[22] Filed: Jun. 3, 1993

[51] Int. Cl.$^6$ .............................................. H01J 37/00
[52] U.S. Cl. .................................................. 250/306
[58] Field of Search ...................... 250/306; 73/826.04

[56] References Cited

U.S. PATENT DOCUMENTS

| | | | |
|---|---|---|---|
| 4,951,510 | 8/1990 | Holm-Kennedy et al. | 73/862.04 |
| 5,069,419 | 12/1991 | Jerman | 251/11 |
| 5,201,992 | 4/1993 | Marcus et al. | |
| 5,210,410 | 5/1993 | Barrett | 250/306 |
| 5,229,606 | 7/1993 | Elings et al. | 250/306 |
| 5,266,801 | 11/1993 | Elings et al. | |
| 5,345,815 | 9/1994 | Albrecht et al. | |

FOREIGN PATENT DOCUMENTS 387906  9/1990  European Pat. Off. .

OTHER PUBLICATIONS

IBM Data Sheet entitled "Introducing the SXM Tip Series", 1992, 2 pages.
M. Tortonese et al., "Atomic resolution with an automic force microscope using piezoresistive detection", Appl. Phys. Lett. vol. 62, No. 8, Feb. 1993, pp. 834–836.
J. Jason Yao et al., "Fabrication of High Frequency Two-Dimensional Nanoactuators for Scanned Probe Devices", Journal of Microelectromechanical Systems, vol. 1, No. 1, Mar. 1992, pp. 14–22.
R. B. Marcus et al., "Polysilicon/SiO$_2$ Interface Microtexture and Dielectric Breakdown", J. Electrochemical Soc., Solid–State Science and Technology, vol. 129, No. 6, Jun. 1982, pp. 1282–1289.
R. B. Marcus et al., "The Oxidation of Shaped Silicon Surfaces", J. Electrochemical Soc., Solid–State Science and Technology, vol. 129, No. 6, Jun. 1982, pp. 1278–1282.
M. Tortonese et al., "Atomic Force Microscopy Using A Piezoresistive Cantilever", Proc. of the Int'l Conf. on Solid State Sensors and Actuators, San Francisco, Jun. 24–27, 1991, pp. 448–451.
S. Akamine et al., "Microfabricated Scanning Tunneling Microscope", IEEE Elec. Device Lett., No. 11, New York, Nov. 1989, 3 pgs.
L. M. Roylance et al., "A Batch-Fabricated Silicon Accelerometer", IEEE Trans. on Elec. Devices, vol. ED–26, No. 12, Dec. 1979, pp. 1911–1917.
*IBM Technical Disclosure Bulletin*, "Speech Coder Utilizing Semiconductor Cantilever", vol. 10, No. 8, Jan. 1968, p. 1259.
S. Yonekubo et al., "Contact Type Line Sensor For Examining Surface Topography", Trans. of Institute of Elec. Engrs. of Japan, vol. 112–C, No. 12, Dec. 1992, Japan, pp. 757–762.

*Primary Examiner*—Bruce C. Anderson
*Attorney, Agent, or Firm*—Skjerven, Morrill, MacPherson, Franklin & Friel; David E. Steuber

[57] ABSTRACT

A cantilever for a scanning probe microscope is disclosed. The cantilever includes a piezoresistor for detecting the deflection of the cantilever, and a tip which is formed integrally with the cantilever. A process of fabricating such a cantilever is also disclosed, the process yielding a tip which has a high aspect ratio and a small radius of curvature at its apex. A combined atomic force/lateral force microscope including two or more piezoresistors responsive to both the bending and torsion of the cantilever is also disclosed.

19 Claims, 12 Drawing Sheets

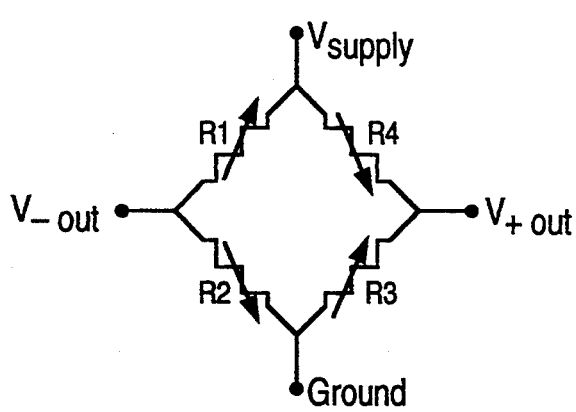
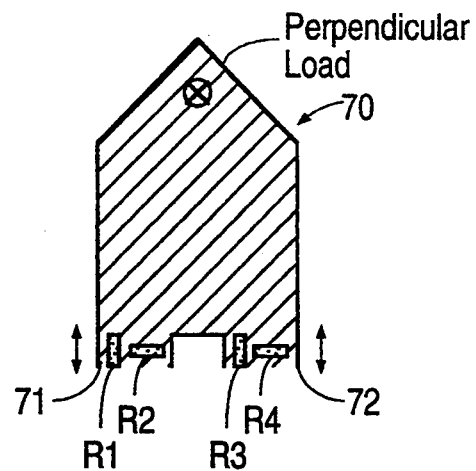
FIG. 7B          FIG. 7A
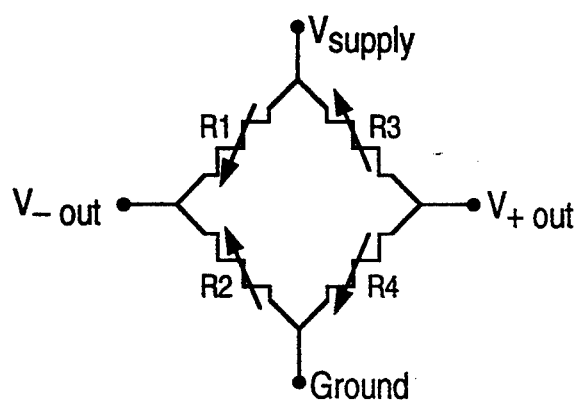
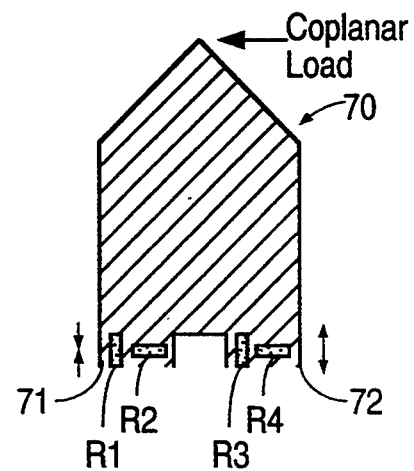
FIG. 8B          FIG. 8A

PIEZORESISTIVE CANTILEVER WITH INTEGRAL TIP FOR SCANNING PROBE MICROSCOPE

FIELD OF THE INVENTION

This invention relates to the cantilevers used in scanning probe microscopes and, in particular, to a piezoresistive cantilever having a sharp, high aspect ratio integral tip.

BACKGROUND OF THE INVENTION

An atomic force microscope (AFM), also referred to as a scanning force microscope (SFM), is an instrument in which a flexible cantilever of very small dimensions is scanned relative to a surface. Such cantilevers typically have a pointed tip which projects from the free end of the cantilever in the direction of the sample surface. As the sample is scanned, forces between the sample surface and the cantilever tip cause the cantilever to deflect, and the topography of the surface is measured by monitoring the deflection of the cantilever. The forces between the sample and the cantilever tip include electrostatic, magnetic, viscous, van der Waals (both repulsive and attractive) and other forces. The cantilever may be used in a contacting mode of operation, in which the tip is in contact with the sample surface, or a non-contacting mode, in which the tip is maintained at a short distance, typically from 5 to 500 Å or more, from the surface of the sample.

AFMs are a single variety of a much broader class of instruments referred to as "scanning probe microscopes" (SPMs). As used herein, "scanning probe microscope" means an instrument which provides a microscopic analysis of the topographical features or other characteristics of a surface by causing a probe to scan the surface. It refers to a class of instruments which employ a technique of mapping the spatial distribution of a surface property, by localizing the influence of the property to a small probe. The probe moves relative to the sample and measures the change in the property or follows constant contours of the property. Depending on the type of SPM, the probe either contacts or rides slightly (up to several 100 Å) above the surface to be analyzed. In addition to AFMs, scanning probe microscopes include devices such as scanning tunneling microscopes (STMs), scanning acoustic microscopes, scanning capacitance microscopes, magnetic force microscopes, scanning thermal microscopes, scanning optical microscopes, scanning ion-conductive microscopes and others.

While the exact design of the cantilever depends on its application, in general the following properties are desirable. The cantilever should have a mass as low as possible for a given length and area and exert an extremely light tracking force on the sample, on the order of $10^{-5}$ to $10^{-10}$ N, in order to avoid damage to the sample. The force constant of the cantilever should be extremely low, on the order of 0.001 N/m to 250 N/m. The cantilever should have a high mechanical resonance frequency, preferably above 10 kHz, to permit fast sample scanning rates. When the AFM is used in non-contact modes, a well defined resonance frequency and low damping (high mechanical Q) are also desirable, to maintain high sensitivity to changes in the resonant frequency of the cantilever. Ideally, a very small point or portion at the apex of the tip interacts with the sample, so that the forces between the cantilever and sample are localized. The cantilever should also be free and exposed, for unobstructed access to the sample.

The cantilever tip should have small dimensions as compared with the features of the sample being analyzed. In this regard, the "aspect ratio" is defined as the ratio of the length of the tip to the width of its base, and for a tip having nonlinear walls the "average aspect ratio" is defined for a distance from the apex of the tip that is considered significant (e.g., about 1-2 μm). The "tip radius" is defined as the radius of curvature of the tip at its apex. In most applications, the aspect ratio should be as high as possible and the tip radius should be as small as possible, so that a minimal portion of the tip interacts with the sample surface and senses the interaction force. For AFMs which are to be used also as scanning tunneling microscopes (STMs), the cantilever and tip must be electrically conductive, so that a tunneling current can flow between the tip and the sample.

Cantilever tips can be produced by a variety of techniques, for example, by gluing tip fragments to the free end of the cantilever, or by depositing material for the tip. Microfabricated cantilevers with integral tips can also be produced. U.S. Pat. No. 4,968,585 describes a method of microfabricating $SiO_2$ cantilevers with integrated conical silicon tips. U.S. Pat. No. 5,021,364 describes a method of microfabricating $Si_3N_4$ cantilevers with integral tetrahedral silicon tips. Both of the foregoing patents indicate that it is desirable to have a tip with a radius of less than 500 Å. Generally speaking, the integral tips in most prior art cantilevers have relatively low aspect ratios and large tip radii, as compared with the sample features being imaged.

Several techniques have been used to detect the deflection of the cantilever as the sample surface is scanned. These techniques include interferometry, optical beam deflection, capacitive sensing, electron tunneling, and piezoresistive detection. Most of these deflection detection systems are external to the cantilever, and they are bulky and require time-consuming fine alignments. An exception is the piezoresistive system, which uses a piezoresistor which is attached to or embedded in the cantilever. Piezoresistive systems derive a signal representative of the bending of the cantilever directly from the cantilever itself, with no external deflection measuring components, and they require many fewer adjustments and alignments than the external systems.

The cantilever of this invention overcomes many of the problems and disadvantages of prior art cantilevers and detection systems.

SUMMARY OF THE INVENTION

A cantilever according to this invention includes a piezoresistor and a tip, both of which are formed integrally with the cantilever itself. In a preferred method of fabrication, the tip is formed in a silicon substrate. The cantilever shape is then formed, and a region of the silicon is doped N-type or P-type, preferably using ion implantation, to form a piezoresistor in the cantilever. The silicon is then etched again to detach the free end of the cantilever from the substrate. The cantilever may be shielded from electrical and optical noise by applying a suitable coating to the surface of the cantilever.

This process lends itself easily to batch fabrication techniques. The process may, for example, be used to form a large number of cantilevers from a single silicon wafer.

Using the methods of this invention, one may fabricate an integral cantilever tip having a high aspect ratio and a small tip radius.

According to another aspect of this invention, the base from which the cantilever projects, which is typically a single die of the silicon substrate, is formed with truncated corners. This configuration helps to avoid unwanted contact between a corner of the die and the surface of the sample.

According to yet another aspect of this invention, the cantilever is shaped so as to localize the stress (and strain) on the piezoresistor as it bends. Localizing the stress increases the sensitivity (change in resistance) of the piezoresistor to deflection of the cantilever. Several methods of localizing the stress in the cantilever are described. For example, corrugations can be formed in one section of the cantilever to increase its stiffness, so that maximum bending occurs at another location. Conversely, the cantilever can be made more flexible at one location (e.g., by making it thinner in either width or thickness) to maximize the stress on the piezoresistor.

Finally, a piezoresistive cantilever for a combined atomic force/lateral force microscope is described. Lateral force refers to a force between the tip and the sample that acts generally parallel to the plane of the cantilever (also referred to as a "coplanar" force). Lateral force sensing devices using optical beam detection systems are known in the art and have been used, for instance, for the measurement and imaging of local friction variations between the tip and the sample (see Mate et al., Phys. Rev. Lett., Vol. 50, p. 120 (1987)), and in the measurement or profiling of sidewall features on a surface, for instance, semiconductor lithographic features for linewidth metrology (see Nyyssonen et al., J. Vac. Sci. Technol., B9, p. 3612 (1991)). These prior art lateral force microscopes have the disadvantages mentioned above. In the lateral force microscope of this invention, two or more piezoresistors are included within the cantilever such that the piezoresistors are responsive to both the bending (vertical deflection) and torsion (twisting about a longitudinal axis) of the cantilever. The piezoresistors are connected to electrical circuitry which permits the change in resistance of the piezoresistors attributable to these two types of strain to be isolated and distinguished. In one embodiment, the cantilever is formed in a two-legged configuration, with one piezoresistor being positioned in each of the legs.

BRIEF DESCRIPTION OF THE DRAWINGS

FIG. 7A illustrates a top plan view and FIG. 7B illustrates a circuit diagram of a lateral force microscope designed to detect perpendicular loads on the tip of the cantilever.

FIG. 8A illustrates a top plan view and FIG. 8B illustrates a circuit diagram of a lateral force microscope designed to detect a coplanar load on the tip of the cantilever.

DESCRIPTION OF THE INVENTION

Figure 1:
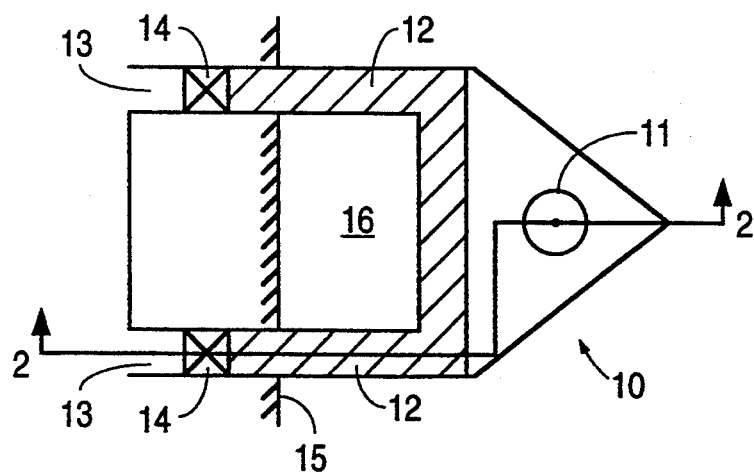
FIG. 1 illustrates a plan view of a piezoresistive cantilever in accordance with this invention.
Figure 2:
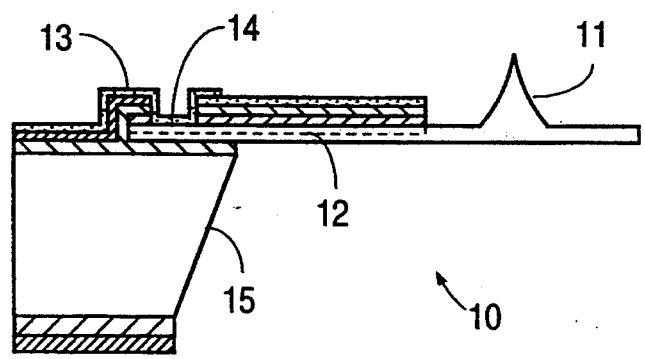
FIG. 2 illustrates a view of the cantilever taken at cross section 2—2 in FIG. 1.

FIGS. 1 and 2 illustrate plan and cross-sectional views of a cantilever 10 according to this invention, FIG. 2 being taken at section 2—2 shown in FIG. 1. Cantilever 10 includes a tip 11 and a piezoresistor 12, the latter being connected to metal lines 13 via contacts 14. These elements are also shown in FIG. 2, which shows that cantilever 10 extends outward from a base 15. Cantilever 10 is generally U-shaped, being formed around a central space 16. It will be understood that by altering the mask the cantilever can be formed in a wide variety of shapes, e.g., with three or more legs or without a central open space.

As shown in FIG. 2, piezoresistor 12 is located on a surface of cantilever 10 which is on the same side as tip 11. The bending of cantilever 10 causes the resistance of piezoresistor 12 to change, and this change is detected, typically in a bridge circuit. The fabrication and operation of a piezoresistive cantilever are described generally in M. Tortonese et al , "Atomic Force Microscopy Using A Piezoresistive Cantilever", printed in Proceedings of Transducers '91, IEEE, New York, 1991, 91 CH2817-5, p. 448, which is incorporated herein by reference.

All AFMs, whether operated in the contact or non-contact mode, function by detecting the bending of the cantilever. It is well known in the art to use a signal representative of the deflection of the cantilever as an input to control circuitry which generates an output representative of the sample surface. For example, in one mode of operation in contact mode, the signal may be delivered to a feedback control system which varies the distance between the sample and the cantilever so as to maintain a constant tracking force. In the non-contact mode, the cantilever is generally vibrated, and variations in the resonant frequency of the cantilever as the sample is scanned are detected. In either case, the critical input to the system is a signal representative of the deflection of the cantilever.

Figure 3A:
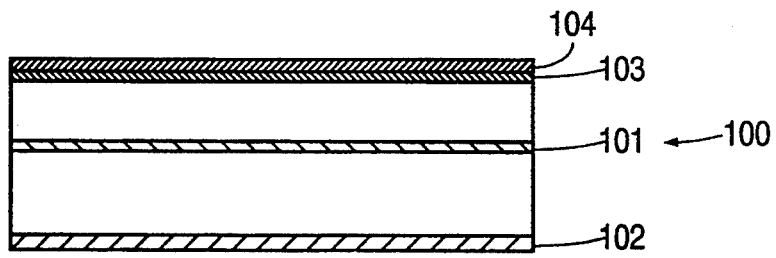
FIGS. 3A–3R illustrate steps in the fabrication of the cantilever.
Figure 3B:
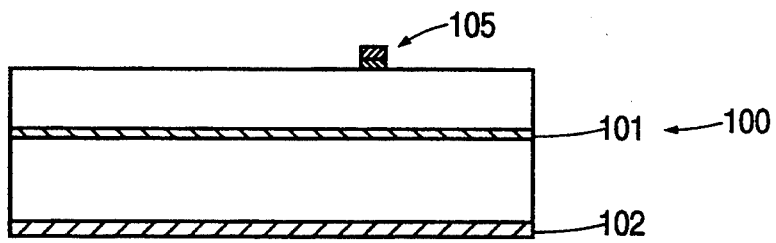
Figure 3C:
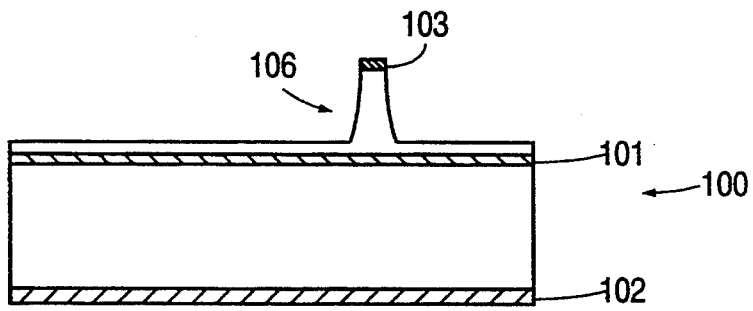
Figure 3D:
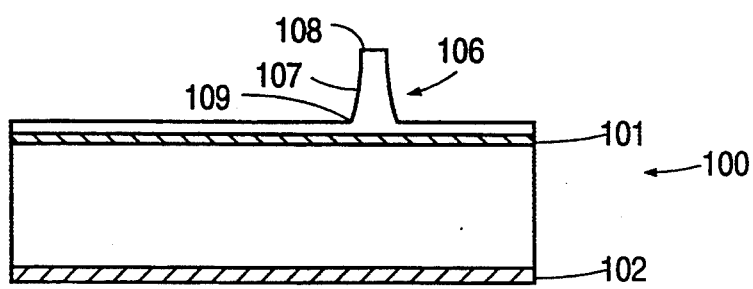
Figure 3E:
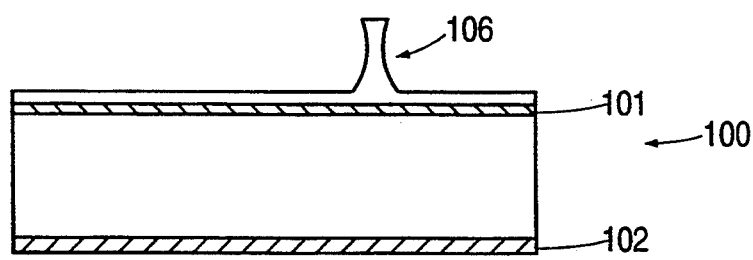
Figure 3F:
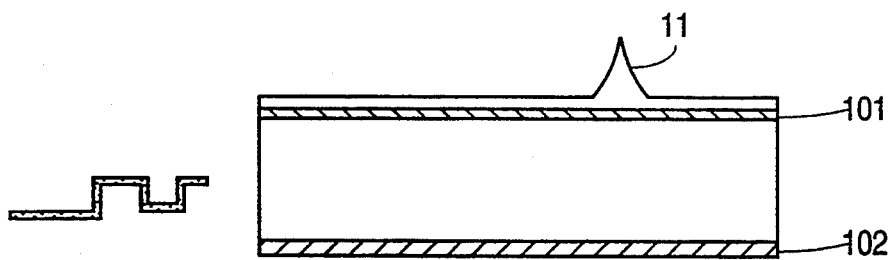
Figure 3G:
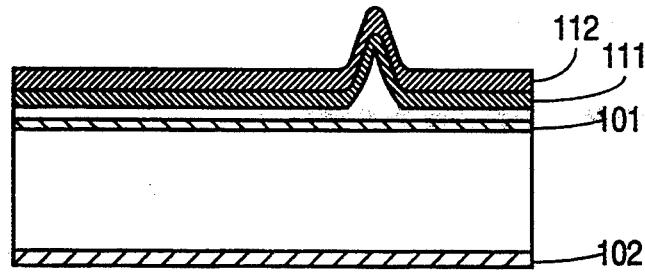
Figure 3H:
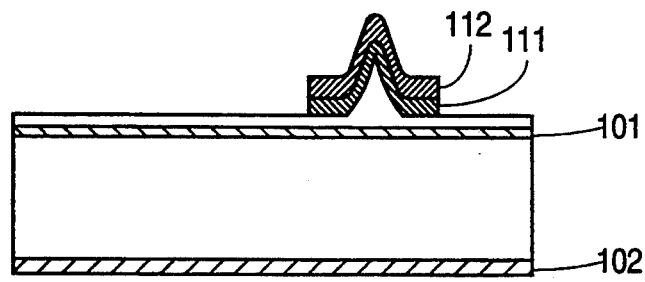
Figure 3I:
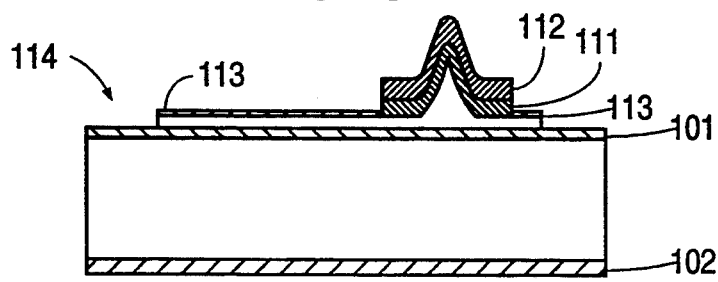
Figure 3J:
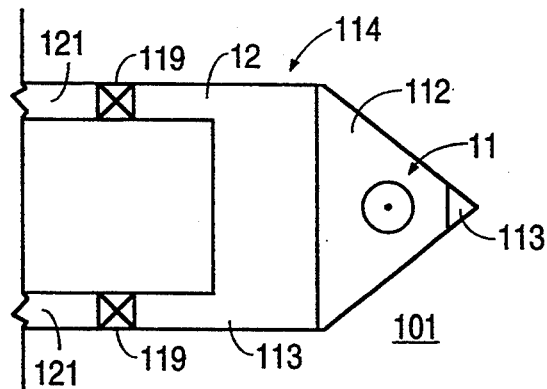
Figure 3K:
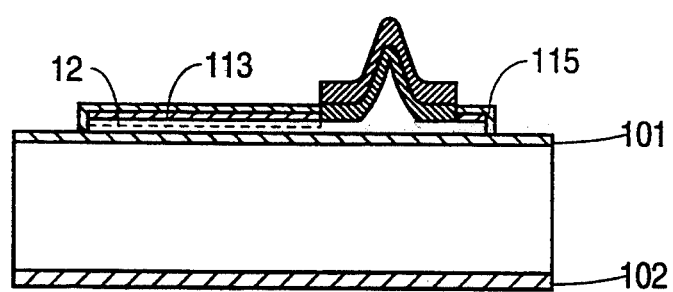
Figure 3L:
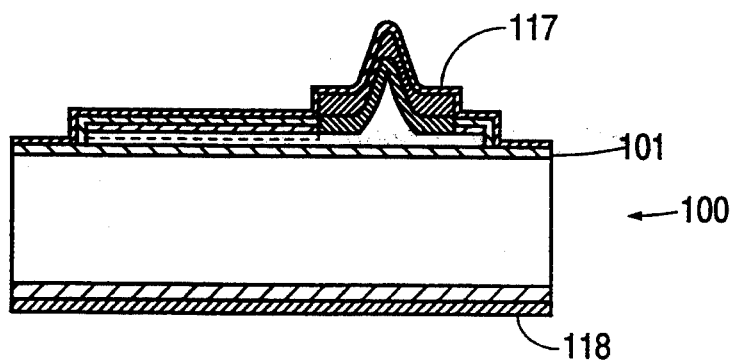
Figure 3M:
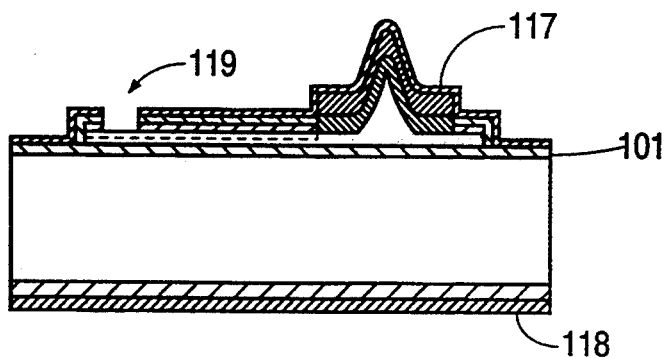
Figure 3N:
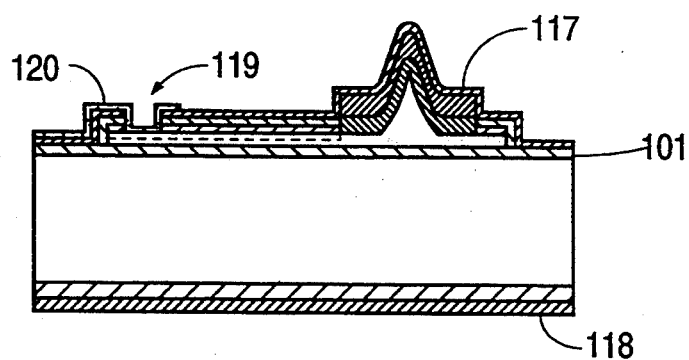
Figure 3O:
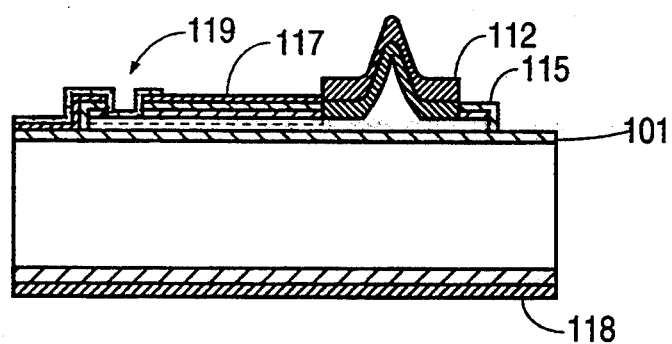
Figure 3P:
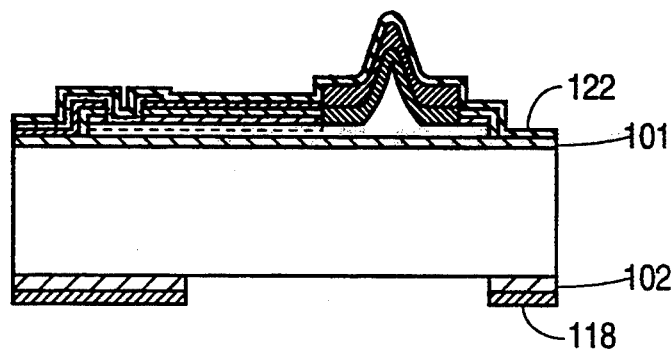
Figure 3Q:
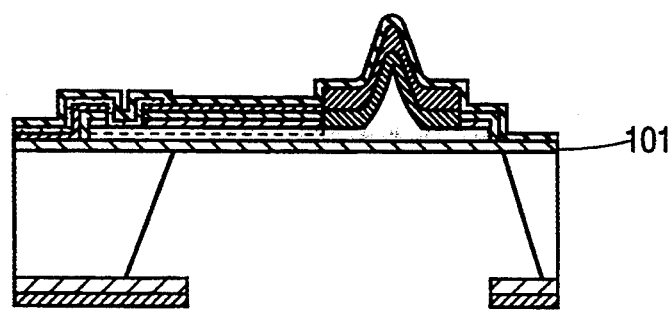
Figure 3R:
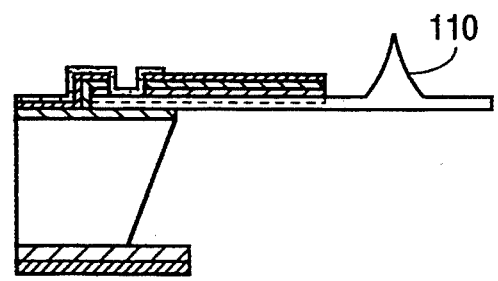

FIGS. 3A–3R illustrate the steps of a process of fabricating the cantilever illustrated in FIGS. 1 and 2. Referring to FIG. 3A, the preferred starting material is a silicon on insulator (SOI) wafer 100 containing an insulation layer 101. In the preferred embodiment, insulation layer 101 is a 1 $\mu$m thick oxide layer which is located approximately 10 $\mu$m below the top surface of wafer 100. (The thicknesses of layer 101 and the other layers illustrated in FIGS. 3A–3R are exaggerated for the sake of clarity.) Wafer 100 is preferably <100> silicon. As described below, insulation layer 101 provides an etch stop when the cantilever beams are freed.

Only a portion of wafer 100 is illustrated in FIGS. 3A–3R. Normally, a number of cantilevers are formed simultaneously in a single wafer, using batch fabrication techniques.

The top and bottom surfaces of wafer 100 are oxidized, forming oxide layers 102 and 103. In the preferred embodiment, layers 102 and 103 are thermal oxide layers. As an alternative, any material with an etch rate different from that of silicon may be used, including nitride, a metal, another type of oxide, or photoresist. Alternatively, an oxide layer could be formed only on the top surface of wafer 100 (layer 102 could be omitted).

After layers 102 and 103 are formed, a photoresist layer 104 is spun on to the top surface of layer 103. Layers 103 and 104 are then patterned using conventional photolithographic techniques to form a pattern of dots. A dot 105 is illustrated in FIG. 3B.

As shown in FIG. 3C, the top surface of wafer 100 is then etched using reactive ion etching (RIE), to form a column 106. The cross-sectional shape of column 106 is determined by the geometry of dot 105 and the degree of anisotropy of the etching method used to etch the silicon. The shape of column 106 in turn determines the dimensions and geometry of the base of the tip which will be formed. As an alternative to RIE etching, a combination of dry and wet etching can be used to etch the silicon. The thickness of oxide layer 103, together with the selectivity of the etchant, determines the height of the column. The column typically has a height on the order of a few microns and nearly vertical side walls. The photoresist portion of dot 105 is preferably removed prior to the etching, but this is not necessary.

As shown in FIG. 3D, following the etching, oxide layer 103 is removed from the top of column 106.

Column 106 is then sharpened by repeated oxidation and stripping of oxide. This known process is described in an article by Marcus et al., Appl. Phys. Lett. 56 (3), 236 (1990). It essentially relies upon the phenomenon that an oxide layer formed on a silicon surface is somewhat thinner in areas of stress, where the oxidation rate is reduced. Accordingly, the oxide grows at a faster rate on the side walls 107 of column 106 than on the top corners 108 or the base corners 109. As the oxide layers are repeatedly grown and removed, therefore, the side walls 107 become progressively more hollowed out, producing a "reentrant" shape with a waist or neck at the level of side walls 107. This shape is illustrated in FIG. 3E. Finally, the waist or neck disappears and the sharpened tip 11 remains. This is illustrated in FIG. 3F.

By stopping the sequence of repeated oxidation and stripping of oxide early, before a sharp tip is formed, a "reentrant" tip shape, as shown in FIG. 3E, having a relatively narrow waist portion and a relatively wide head portion, may be obtained. Such a reentrant tip can be used as a lateral AFM tip. The overhanging head of the reentrant tip can be used to image the sides of steep sidewall features in an AFM.

In the preferred method, a low temperature wet oxide process is used for sharpening. Other etching techniques could be used to form column 106 and tip 11. For example, column 106 could be formed by anisotropic etching and then tip 11 could be formed by isotropic etching. Another possibility would be to use wet etching to form column 106 and oxide sharpening to form tip 11. The application of different etching methods produces different tip shapes.

When the sharpening process is complete, the last oxide layer, designated as layer 111 in FIG. 3G, is left in place. Layer 111 may be, for example, approximately 400 Å thick. As necessary, an additional oxide layer, designated 112, may be formed to protect the tip during further processing. Preferably the protective layers of oxide over the tip are approximately 1 μm thick. These layers may be formed on both sides of the wafer.

As shown in FIGS. 3H and 3J, oxide layers 111 and 112 are patterned and etched using conventional photolithographic techniques so that they cover only the area of the tip of the cantilever. As illustrated in FIGS. 3I and 3J, a thin oxide layer 113, preferably on the order of 200 Å thick, is then grown and patterned in the shape of the cantilever, which is designated by the reference numeral 114 in FIGS. 3I and 3J. The silicon is then etched down to insulation layer 101 to expose the sides of the cantilever. Oxide layer 113 is left on after etching as a passivation layer. In the preferred method of forming cantilever 114, RIE etching is used to obtain nearly vertical sidewalls. Other etching methods may also be used.

As shown in FIG. 3K, an additional oxide layer 115, preferably on the order of 200 Å thick, is then deposited on top of oxide layer 113 and on the sides of cantilever 114. Oxide layer 115 provides additional protection as an etch stop, covering the sides of cantilever 114 so that bare silicon is not exposed to the etchant used to free the cantilever later. Oxide layers 113 and 115 also balance the stress resulting from the insulator layer that is deposited in a later step. Furthermore, oxide layers 113 and 115 improve the electrical performance of the device and provide additional screen oxide for the implant. Oxide layers 113 and 115 therefore act as etch stop, mechanical trim, electrical barrier, and screen oxide. All of these purposes are important.

The silicon in cantilever 114 is then doped using ion implantation to form piezoresistor 12. The energy and dose of the implantation depend on the thickness and conductivity of the implant region (piezoresistor) desired. This implantation also reduces the contact resistance to metallization later. For example, boron ions may be implanted to a concentration of $1 \times 10^{-15}$ cm$^{-3}$ at 80 keV. As noted, wafer 100 is preferably {100} silicon, and the length of piezoresistor 12 preferably extends along a <110> axis of the {100} plane.

Alternatively, piezoresistor 12 could be formed before the silicon is etched to form cantilever 114.

Next, as shown in FIG. 3L, insulator layers 117 and 118, which may be nitride layers, are deposited on the top and bottom surfaces of wafer 100. Layers 117 and 118 are preferably deposited by a low pressure chemical vapor deposition (LPCVD) process, at a thickness on the order of 250–1000 Å. As noted above, the deposited insulator layer 117 helps to balance the stress resulting from the underlying oxide layers 113 and 115, and it also provides a mask to allow the later removal of oxide layers 111 and 112 surrounding the tip. Alternatively, any material that can be etched at a slower rate than oxide and can withstand the processing temperatures can be used. If desired, layer 118 may be omitted.

The wafer is then annealed in order to redistribute and electrically activate the implant which forms piezoresistor 12. The time and temperature of the annealing process depend on the thickness of the implant region desired. In the preferred embodiment, a 20 minute anneal at 1000° C. was used.

If desired, the annealing process may be performed before nitride layers 117 and 118 are deposited.

Next, as shown in FIG. 3M, nitride layer 117 is patterned and etched, using standard photolithographic techniques, to form contact holes 119 for photoresistor 12. In the preferred method, a timed RIE etch is used to remove both nitride layer 117 and oxide layers 113 and 115. Optionally, a wet etch can then be performed to ensure that the exposed silicon is bare and clean. The exposed silicon may also be etched slightly. A contact implant may also be performed.

As shown in FIG. 3N, a metal layer 120 is then deposited. Metal layer 120 is preferably aluminum and must be thick enough to ensure adequate coverage of the walls of contact holes 119. Standard photolithographic and etching techniques are then used to define and etch metal layer 120 leaving metal interconnects 121 (FIG. 3J). The wafer is then annealed for a sufficient time and at a sufficient temperature to ensure good ohmic contact between interconnects 121 and piezoresistor 12.

Deposited insulator layer 117 is then patterned and etched from the region surrounding tip 100, leaving oxide layers 112 and 115 and insulation layer 101 exposed. The result of this step is illustrated in FIG. 3O. As shown, layer 117 remains in the region between contact hole 119 and tip 100.

As shown in FIG. 3P, a protective layer 122, for instance a polymeric layer such as polyimide, is formed on the entire top surface of the wafer and then baked. Protective layer 122 provides mechanical and chemical protection for the tip during the etching of the bottom surface of the wafer (see below). Layer 122 could also include another type of polymer or a deposited oxide, deposited metal or tar. Oxide layer 102 and insulator layer 118 are then patterned and etched from a region on the bottom surface of the wafer. The resulting structure is illustrated in FIG. 3P.

The silicon is then etched from the bottom side of the wafer to the insulation layer 101, as shown in FIG. 3Q. The preferred technique is to use a selective etchant such as ethylene diamine pyrocatecol (EDP), which has a relatively low oxide etch rate. Other etchants besides EDP, including anisotropic and isotropic etchants, could be used.

As an alternative, the bottom side insulator layer 118 could be etched at the same time as the top side layer 117 (FIG. 3O). Protective layer 122 would then be formed and baked.

Finally, as shown in FIG. 3R, the insulation layer 101 is etched from beneath the cantilever, and protective layer 122 is removed. Oxide layers 111-113 and 115 and insulation layer 101 are then removed, leaving tip 11 exposed. It is preferable to etch the insulation layer 101 first and then remove protective layer 122, since the insulation layer 101 is under compression and can easily break. If insulation layer 101 tears, the cantilever tends to break.

The wafer 100 is then separated into individual cantilever dice.

Figure 4:
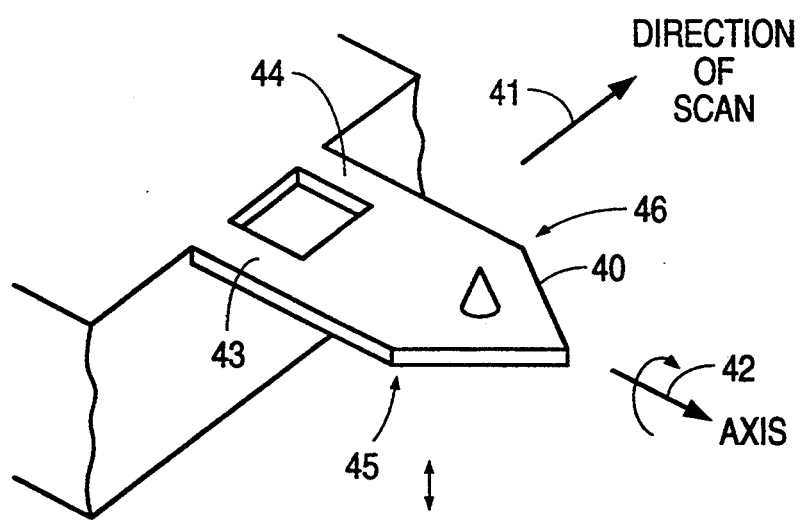
FIG. 4 illustrates a general perspective view of a cantilever for use in a lateral force microscope.

In a lateral force microscope (LFM) the torsion of a cantilever positioned parallel to the surface of the sample is used to detect lateral forces between the cantilever tip and the sample. These lateral forces may be due, for instance, to friction between the tip and sample, or to attractive or repulsive van der Waals forces between the tip and surface of a steep feature on a sample. LFMs are described in an article by C.M. Mate et al., Phys. Rev. Lett. 50, page 120 (1987). The basic principle of lateral force measurement is illustrated in FIG. 4, which shows a cantilever 40, which is scanned in a direction indicated by arrow 41, which is generally perpendicular to the longitudinal axis of the cantilever (indicated by an arrow 42). As the tip of cantilever 40 encounters features on the surface of a sample, it deflects vertically, in the same manner as a normal AFM, with the flexure regions of the cantilever (designated by the reference numerals 43 and 44) deflecting approximately equally and in the same direction. Thus the stresses and strains within the flexure regions 43 and 44 vary approximately equally and in the same sense when cantilever 40 is deflected. In addition, lateral forces between the tip and the sample surface cause cantilever 40 to twist about its longitudinal axis or bend laterally. In the first case, there is a general rotation of cantilever 40, with corners 45 and 46 moving in opposite directions, resulting in opposite deflections of flexures 43 and 44. The degree of this torsional movement is used to measure the lateral forces between the tip and the sample surface.

Figure 5:
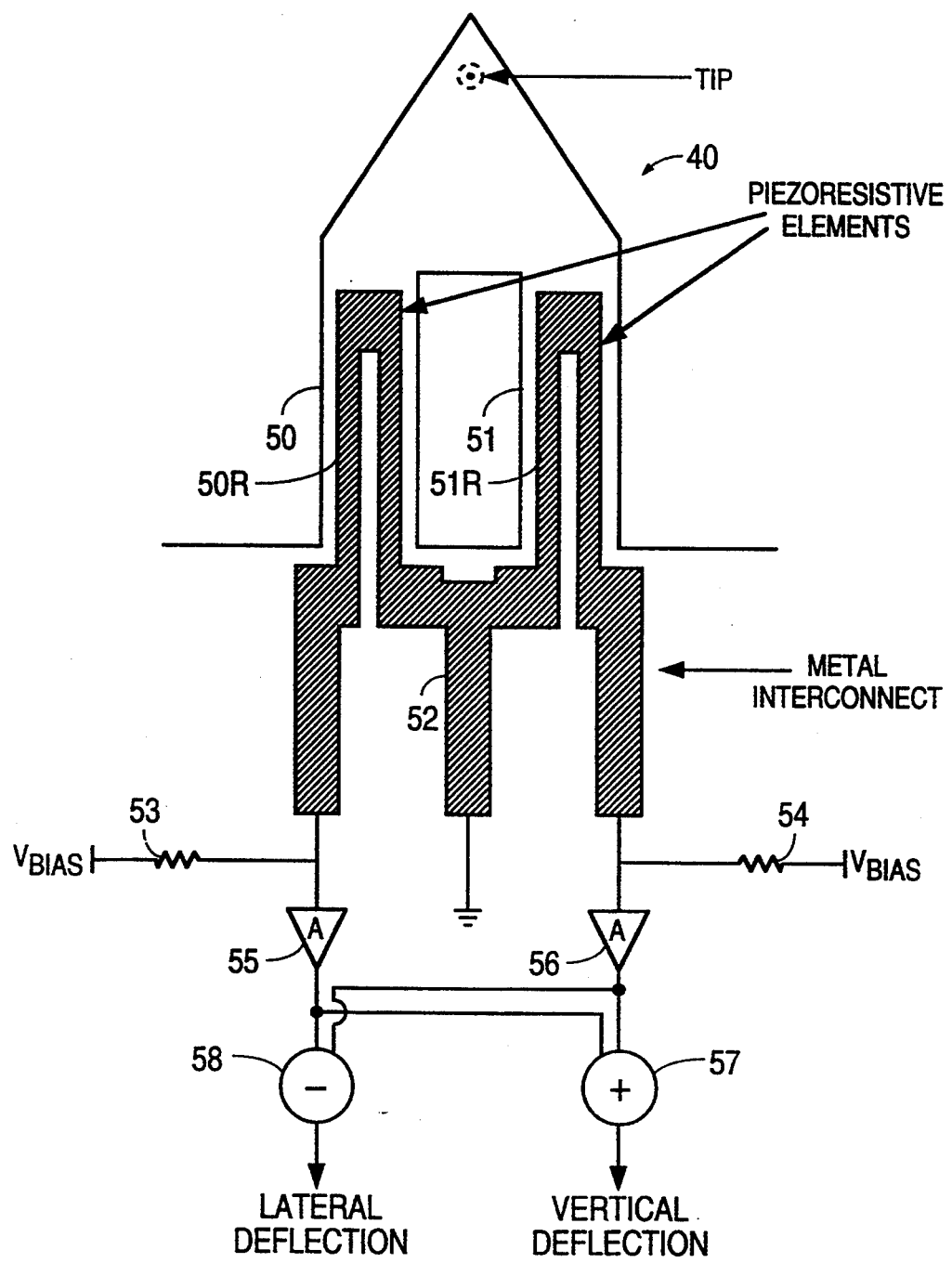
FIG. 5 illustrates a top plan view of a cantilever for use in a lateral force microscope including a piezoresistor.

FIG. 5 is a top plan view of cantilever 40. Cantilever 40 includes legs 50 and 51 which contain separate piezoresistors 50R and 51R, respectively. One end of each of piezoresistors 50R and 51R is connected to a central contact 52, which is grounded. The other end of piezoresistor 50R is connected through a resistor 53 to a voltage $V_{BIAS}$. The other end of piezoresistor 51R is connected through a resistor 54 to the voltage $V_{BIAS}$. Thus resistor 53 and piezoresistor 50R form one voltage divider circuit; and resistor 54 and piezoresistor 51R form a second voltage divider circuit. The respective midpoints of the voltage divider circuits are connected to amplifiers 55 and 56. The outputs of amplifiers 55 and 56 are connected to the inputs of an addition amplifier 57 and a differential amplifier 58, in the manner shown in FIG. 5. Since piezoresistors 50R and 51R are positioned near the top surface of legs 50 and 51, deflection of cantilever 40 in a vertical direction gives rise to an equal change in resistance (dR) in both piezoresistors. In contrast, when cantilever 40 is subjected to a torsional force as a result of a frictional force on its tip, piezoresistors 50R and 51R exhibit equal but opposite changes in resistance (dr).

Thus if the resistance of piezoresistor 50R is represented as R+dR+dr when cantilever is deflected by a given amount, the resistance of piezoresistor 51R would be R+dR−dr, where R represents the static resistance, dR represents a change in resistance due to a vertical deflection of the cantilever, and dr represents a change in resistance due to torsion of the cantilever.

In the first order approximation, the output of addition amplifier 57 would be proportional to:

$$(R+dR+dr)+(R+dR-dr)=2(R+dR) \qquad (1)$$

and the output of differential amplifier 58 would be proportional to:

$$(R+dR+dr)-(R+dR-dr)=2dr \qquad (2)$$

Thus, as shown by equation (1), the output of amplifier 57 is a function only of the vertical force on the cantilever tip, and as shown by equation (2), the output of amplifier 58 is a function only of the lateral force on the cantilever tip. The two output signals are used as control and data signals in an AFM and LFM in a manner well known in the art.

Piezoresistors 50R and 51R may be formed using known photolithographic techniques. For example, an oxide layer may be grown on the top surface of cantilever 40 except in the areas where photoresistors 50R and 51R are to be located. Using the oxide layer as a mask, ions are implanted in the top surface of cantilever 40. Alternatively, a photoresist mask could be used.

It will be understood to those skilled in the art that equivalent lateral and vertical sensing means could be effected in a wide variety of ways, such as by building piezoresistors 50R and 51R side by side in a one-legged cantilever. Alternatively, a multi-legged cantilever with any number of legs (i.e., having three, four or N legs) could be constructed, with separate piezoresistors being positioned in each of the legs. The electrical output of each pair of piezoresistors would then be added and subtracted in the manner described above to detect the vertical and torsional deflection of the cantilever. At the other extreme, a single piezoresistor in a cantilever may be used to detect torsion of the cantilever in response to a coplanar force on the tip, provided that the piezoresistor is connected to circuitry which is capable of detecting variations on its resistance. The piezoresistor may be oriented longitudinally, transversely or at an oblique angle.

Figure 6:
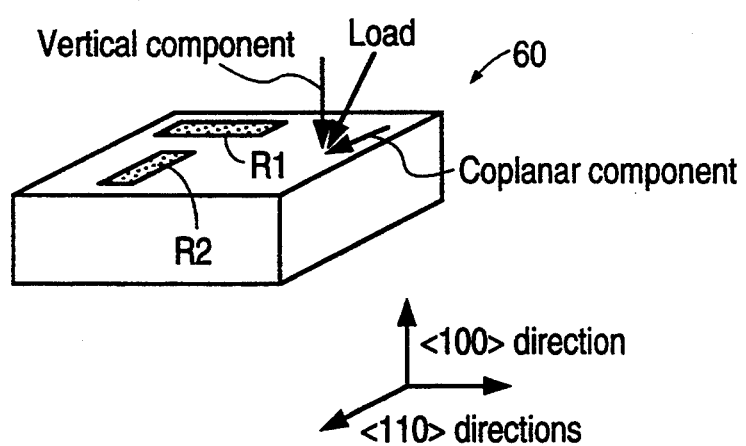
FIG. 6 illustrates a conceptual view of a cantilever for use in an alternative embodiment of a lateral force microscope.

FIGS. 6–8 illustrate an alternative embodiment of a combined AFM/LFM. The principle of this embodiment is illustrated in FIG. 6, which shows a section 60 of a cantilever which is subjected to a load having both vertical and coplanar components. The load represents the force that might be imposed on the tip of a cantilever as it scans the surface of a sample. The vertical component represents forces imposed in a direction perpendicular to the surface of the sample by surface features. The coplanar component represents the lateral force between the tip and the sample surface, which is in a direction parallel to the top and bottom surfaces of the cantilever. Implanted on the top surface of section 60 are a longitudinal resistor R1 and a transverse resistor R2. Longitudinal resistor R1 is oriented generally parallel to the main longitudinal axis of the cantilever. Transverse resistor R2 is oriented perpendicular to the main axis of the cantilever.

The cantilever shown in FIG. 6 is assumed to be silicon, and the orientation of the silicon crystals is also shown. Both longitudinal resistor R1 and transverse resistor R2 are oriented parallel to the two orthogonal <110> axes in the {100} plane of the silicon crystal. It can be shown that for any strain oriented in a <110> direction, the effect on the resistance of resistors R1 and R2 is approximately equal and opposite. That is, $$\frac{d\rho_{R1}}{d\epsilon} = -\frac{d\rho_{R2}}{d\epsilon}$$

where $\rho_{R1}$ and $\rho_{R2}$ represent the resistivity of resistors R1 and R2 and $\epsilon$ represents strain.

FIGS. 7A and 7B illustrate a top view of a cantilever 70 having two legs 71 and 72. Embedded in the top surface of leg 71 are longitudinal resistor R1 and transverse resistor R2, and embedded in a similar pattern in the top surface of leg 72 are a longitudinal resistor R3 and a transverse resistor R4. When cantilever 70 is subjected to a downward perpendicular load, as shown in FIG. 7A, the top surfaces of legs 71 and 72 are placed in tension.

Each of the resistor pairs is connected in series. One end of the series combination is connected to a supply voltage $V_{supply}$ and the other end of the resistor pair is connected to ground. A first output $V_{-out}$ is taken at the junction of resistors R1 and R2 and a second output $V_{+out}$ is taken at the junction of resistors R3 and R4, so as to form a Wheatstone bridge. The output of the circuit is the difference between $V_{+out}$ and $V_{-out}$.

A circuit diagram for an arrangement designed to detect a perpendicular load on cantilever 70 is illustrated in FIG. 7B, where $V_{supply}$ is connected to resistors R1 and R4 and resistors R2 and R3 are grounded. Assuming that the four resistors are equal in value, in an unstressed condition $V_{+out}$ equals $V_{-out}$, and the differential output is 0. In the configuration shown in FIG. 7B, the differential output represents primarily the perpendicular component of a load applied to the end of cantilever 70, while the coplanar load is substantially rejected, since it appears as a common mode output. The perpendicular load causes the resistance of resistors R1 and R3 to change in the same direction, creating a difference between $V_{+out}$ and $V_{-out}$. The resistance of piezoresistors R2 and R4 will change in a direction opposite to the resistance change of resistors R1 and R3, thus doubling the output.

FIGS. 8A and 8B illustrate a configuration designed to detect a coplanar load on cantilever 70. The leads from resistors R3 and R4 are reversed, so that $V_{supply}$ is applied to resistor R3 and resistor R4 is grounded.

If a coplanar load is applied, as shown in FIG. 8A, the resistance of piezoresistors R1 and R3 will change in opposite directions, and a differential output signal will appear at $V_{+OUT}$ and $V_{-OUT}$, which represents primarily the coplanar load, while the perpendicular load is substantially rejected since it will appear as a common mode output. The resistance of piezoresistor R2 will change in a direction opposite to the change in piezoresistor R1, and the resistance of piezoresistor R4 will change in a direction opposite to the change in piezoresistor R3, thus doubling the output.

In the configuration shown in FIGS. 7 and 8, the transverse piezoresistors R2 and R4 in effect double the output (i.e., if the values of these resistors were fixed, the output $V_{+OUT} - V_{-OUT}$ would be reduced by one-half). In addition, in these configurations all four resistors are located on the cantilever in a full bridge implementation. An advantage of these configurations is that all four resistors are at substantially the same temperature, thus achieving thermal balance. The cantilever configuration shown in FIGS. 7 and 8 can also be used in an AFM to measure vertical force on the tip while substantially rejecting the coplanar force signal.

To avoid electrical pickup and lower the optical sensitivity of the piezoresistive cantilever, it is desirable to shield the piezoresistor from electrical and optical sources of noise. Optical radiation may excite the electrons into the conduction band of the semiconductor material, thereby changing its conductivity and resistance. The piezoresistor can be shielded by applying a suitable optical coating to block optical radiation, by absorption or reflection. The coating could include, for example, a metallic substance, an optically absorbing material (e.g., black paint), a reflective dielectric layer (e.g., $Si_3N_4$ of appropriate thickness), or a polymer. The optical coating could be applied by immersion, spraying or deposition. It could be formed at an early stage of the process, on the whole wafer, or at the end of the process, on the individual cantilever die.

Depending on the material used as the coating, it may be necessary to use a mask or shield to keep certain regions of the cantilever from being coated. For example, if a conductive coating (e.g., a metallic layer) is used, it is necessary to avoid coating the metal contacts. Standard lithographic techniques are used to mask regions of the cantilever for this purpose.

Figure 9:
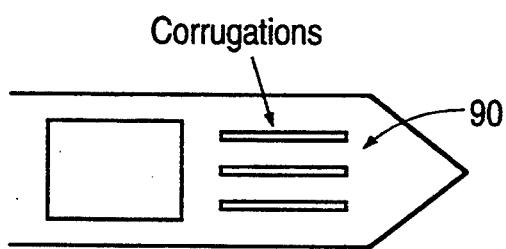
FIG. 9 illustrates a top plan view of a cantilever containing corrugations in areas outside the piezoresistor.
Figure 10:
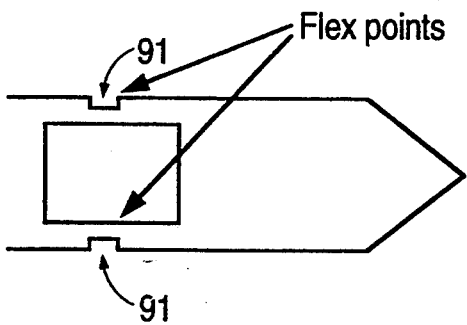
FIG. 10 illustrates a top plan view of a cantilever containing areas of reduced resistance to bending in the region of the piezoresistor.

In order to increase the sensitivity of piezoresistive cantilevers, it is desirable to localize the stress and strain to the active, piezoresistive region. Methods of localizing the strain are illustrated in FIGS. 9 and 10. As shown in FIG. 9, the bending in the piezoresistive region may be increased by providing a series of corrugations which stiffen the end of the cantilever. Corrugations 90 may be formed by patterning a series of longitudinal lines at the same time that the dots 105 are formed (FIG. 3B). When the top surface of the wafer is etched, as shown in FIG. 3C, the lines will cause ridges or corrugations to be formed on the top surface of the cantilever. The depth of the corrugations is determined by the amount of silicon etched. Patterns other than parallel corrugations may also be formed.

Corrugations represent a single form of variations in the thickness of the cantilever. There are other types and patterns of thickness variations (e.g., various patterns of ridges and valleys) that will also perform the function of making a portion of the cantilever more resistant to bending. Any transition from a thicker to a thinner portion of the cantilever, provided that it is not oriented transverse to the longitudinal axis of the cantilever, will tend to make the cantilever stiffer.

A second technique of localizing the stress in the piezoresistive region is to make a portion of the cantilever near the piezoresistor less resistant to bending. This technique is illustrated in FIG. 10, where notches 91 have been formed in the side edges of the cantilever. Notches 91 may be formed when the cantilever is patterned, as shown in FIG. 3I. As will be evident, there are numerous ways of making the cantilever thinner in the region of the piezoresistor to make it bend more easily.

Figure 11:
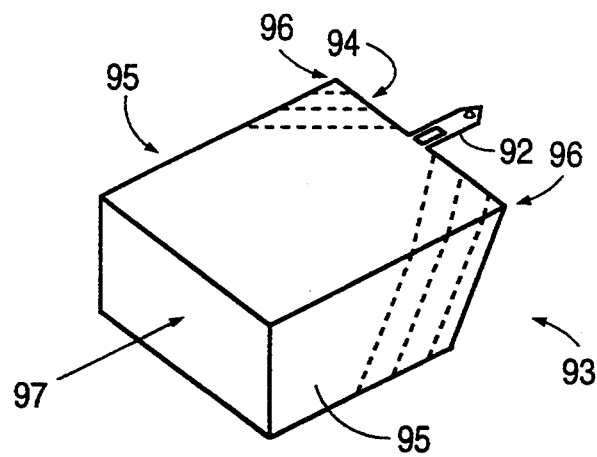
FIG. 11 illustrates a typical cantilever attached to a semiconductor die.

FIG. 11 illustrates a general perspective view of a prior art cantilever 92 extending from a semiconductor die (base) 93. Typically, the cantilevers are formed in rows on the semiconductor substrate. The front die face indicated by the reference numeral 94 in FIG. 11 is formed when the cantilever is freed by etching from the back side of the wafer (see FIG. 3Q). The side faces 95 of the die may be formed by saw cutting, thereby separating the dies from each other. A problem with this technique is that it yields corners 96 on either side of the cantilever which may collide with the surface of the sample as the cantilever approaches the sample. One method to solve this problem would be to form a cantilever die with recessed (truncated) corners. This method would have an additional advantage in that separating the individual cantilever dice (for instance, by snapping them apart) would be made more convenient.

A conceivable solution to this problem would be to form a mask on the backside of the wafer and form three sides of the die (corresponding to faces 94 and 95) by etching. The fourth side (corresponding to face 97) could be etched or saw cut. This process is not practical, however, because the etchant works so rapidly at the corners of the die (indicated by the dashed lines in FIG. 11) that the corners may erode, resulting in the cantilever die detaching. There is also a serious risk that the cantilever itself will be undercut and detached from the die.

Figure 12:
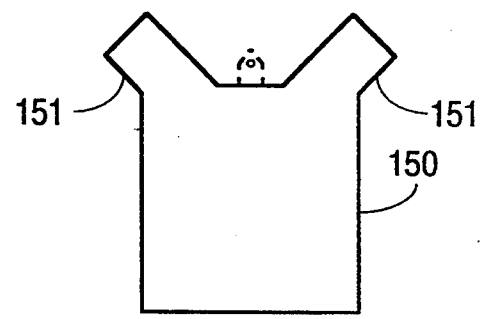
FIG. 12 illustrates a mask for forming a cantilever die having truncated corners.
Figure 13:
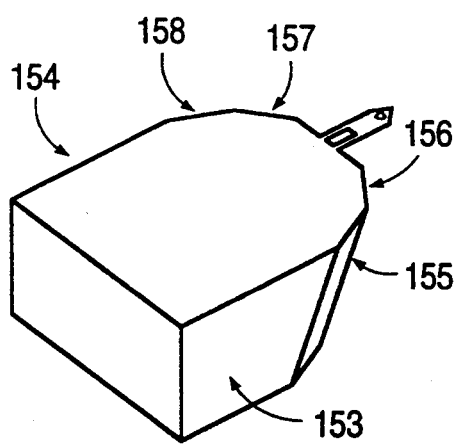
FIG. 13 illustrates a cantilever die having truncated corners.

FIG. 12 illustrates a mask 150 which may be used to overcome this problem. Mask 150 has two "wings" 151, which protrude from the corners of the mask adjacent the cantilever (indicated by dashed lines). Wings 151 in effect add to the amount of semiconductor material which must be etched before the area of the cantilever is reached, and therefore lengthen the etching processing, allowing the corners to be rounded controllably. The resulting die, illustrated in FIG. 13, has truncated corners which are less likely to contact the surface of the sample. In FIG. 13, side faces 153 and 154 correspond to {111} planes of the silicon substrate, while faces 155, 156, 157 and 158, which correspond to the truncated corners, correspond to {211} faces of the silicon.

What has been described, accordingly, is a structure of, and a method of fabricating, a piezoresistive cantilever having an integral tip. The tip may have a high aspect ratio (e.g., greater than 2:1) and a very small tip radius (e.g., less than 200 Å). While a particular embodiment according to this invention has been described, the principles of this invention extend to numerous alternative embodiments which will be apparent to those skilled in the art.

We claim:

1. A cantilever for use in a scanning probe microscope, said cantilever comprising:
   a fixed end, said fixed end being attached to a base member;
   a tip located near the free end of the cantilever;
   a piezoresistor positioned in the cantilever such that the resistance of the piezoresistor varies when the free end of the cantilever is deflected; and
   a shielding layer applied to a surface of the cantilever to protect the piezoresistor from electrical and optical sources of noise.

2. The cantilever of claim 1 wherein the shielding layer comprises a material from the group consisting of a metallic substance, an optically absorbing material, a reflective dielectric layer, and a polymer.

3. A cantilever for use in a scanning probe microscope and a semiconductor die attached to a fixed end of said cantilever, said die comprising a front face, two side faces, truncated corners being formed at intersections between said front face and said side faces.

4. The cantilever of claim 3 wherein said die comprises silicon.

5. A cantilever for use in a scanning probe microscope, said cantilever comprising:
   a fixed end and a free end, said fixed end being attached to a base member;
   a tip located near the free end of the cantilever; and
   a piezoresistor positioned in the cantilever such that the resistance of the piezoresistor varies when the free end of the cantilever is deflected, a notch being formed in a region of the cantilever near the piezoresistor so as to increase the change in resistance of said piezoresistor in response to a deflection of the free end of the cantilever.

6. The cantilever of claim 5 wherein the cantilever comprises two legs and a notch is formed in each leg adjacent to the piezoresistor.

7. A cantilever for use in a scanning probe microscope, said cantilever comprising:
   a fixed end and a free end, said fixed end being attached to a base member;

a tip located near the free end of the cantilever;

two legs oriented parallel to a longitudinal axis of the cantilever; and a piezoresistor located in at least one of said legs, said at least one leg having a thinner portion which is less resistant to bending than the remainder of said leg.

8. A cantilever for use in a scanning probe microscope, said cantilever comprising:

a fixed end and a free end, said fixed end being attached to a base member;

a tip located near the free end of the cantilever; and a piezoresistor positioned in the cantilever such that the resistance of the piezoresistor varies when the free end of the cantilever is deflected, one or more thickness variations being formed in a section of the cantilever to stiffen that section of the cantilever.

9. The cantilever of claim 8 wherein the thickness variations comprise a plurality of corrugations.

10. A cantilever for use with a lateral force microscope, said cantilever comprising:

a fixed end and a free end, said fixed end being attached to a base member;

a tip located near the free end of the cantilever;

first and second piezoresistors positioned in the cantilever such that a lateral force on the tip produces a decrease in the resistance of the first piezoresistor and an increase in the resistance of the second piezoresistor and a perpendicular force on the tip produces a change in the same sense in the respective resistances of the first and second piezoresistors; and output circuitry connected to the first and second piezoresistors, the output circuitry being for delivering a first output signal responsive to a torsional movement of the cantilever and thereby representative of a magnitude of the lateral force on the tip, and a second output signal responsive to a bending of the cantilever and thereby representative of the magnitude of the perpendicular force on the tip.

11. The cantilever of claim 10 wherein the magnitude of the second output signal is determined by a sum of the respective resistances of the first and second piezoresistors.

12. The cantilever of claim 10 wherein the cantilever comprises a plurality of legs, a piezoresistor being positioned in each of the legs.

13. The cantilever of claim 12 wherein the cantilever comprises two legs.

14. The cantilever of claim 10 wherein the first piezoresistor comprises a first longitudinal piezoresistor and the second piezoresistor comprises a a second longitudinal piezoresistor, said cantilever further comprising a first transverse piezoresistor and a second transverse piezoresistor, the longitudinal piezoresistors being oriented parallel to a main axis of the cantilever and the transverse piezoresistors being oriented perpendicular to the main axis of the cantilever.

15. The cantilever of claim 14 comprising a first leg and a second leg, the first longitudinal piezoresistor and the first transverse piezoresistor being positioned in the first leg, and the second longitudinal piezoresistor and the second transverse piezoresistor being positioned in the second leg.

16. The cantilever of claim 15 wherein the first and second longitudinal resistors and the first and second transverse resistors are interconnected so as to form a bridge circuit.

17. The cantilever of claim 16 wherein said cantilever comprises a plurality of legs, each of said legs comprising a longitudinal piezoresistor and a transverse piezoresistor.

18. The cantilever of claim 10 wherein the magnitude of the first output signal is determined by a difference between the respective resistances of the first and second piezoresistors.

19. A cantilever for use in a scanning probe microscope, said cantilever comprising:

a fixed end and a free end, said fixed end being attached to a base member;

a tip located near the free end of the cantilever, said tip comprising a relatively narrow waist portion and a relatively wide head portion; and a piezoresistor within the cantilever, the piezoresistor positioned such that a resistance of the piezoresistor varies when the tip of the cantilever is subjected to a lateral force.

* * * * *

UNITED STATES PATENT AND TRADEMARK OFFICE
CERTIFICATE OF CORRECTION

PATENT NO.   :   5,444,244
DATED        :   August 22, 1995
INVENTOR(S)  :   Michael D. Kirk, Ian R. Smith, Macro Tortonese, Sean S. Cahill and Timothy G. Slanter It is certified that error appears in the above-identified patent and that said Letters Patent is hereby corrected as shown below:

On the title page: Item [54] and Column 1, line 1, should read --PIEZORESISTIVE CANTILEVER FOR SCANNING PROBE MICROSCOPE--.

Item [75] inventors, after "Tortonese," delete "Standford" and substitute --Stanford--.

Col. 14, line 10, Claim 14, delete "a" (second occurrence).

Signed and Sealed this

Fifth Day of March, 1996

Attest:

BRUCE LEHMAN

*Attesting Officer*  *Commissioner of Patents and Trademarks*